(12) United States Patent
Chowdhury et al.

(10) Patent No.: US 9,311,274 B2
(45) Date of Patent: Apr. 12, 2016

(54) APPROACH FOR SIGNIFICANT IMPROVEMENT OF FFT PERFORMANCE IN MICROCONTROLLERS

(71) Applicant: TEXAS INSTRUMENTS INCORPORATED, Dallas, TX (US)

(72) Inventors: Prohor Chowdhury, Bangalore (IN); Alexander Tessarolo, Lindfield NSW (AU)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 258 days.

(21) Appl. No.: 14/056,111

(22) Filed: Oct. 17, 2013

(65) Prior Publication Data

US 2015/0113030 A1     Apr. 23, 2015

(51) Int. Cl.
*G06F 15/00*     (2006.01)
*G06F 17/14*     (2006.01)

(52) U.S. Cl.
CPC .................... *G06F 17/142* (2013.01)

(58) Field of Classification Search
CPC ....................................................... G06F 17/142
USPC ................................................... 708/404, 409
See application file for complete search history.

(56) References Cited

U.S. PATENT DOCUMENTS

| | | | |
|---|---|---|---|
| 2003/0236809 A1* | 12/2003 | Hou | G06F 17/142 708/400 |
| 2010/0005372 A1* | 1/2010 | Dent | H03M 13/41 714/795 |
| 2012/0254273 A1* | 10/2012 | Asanaka | G06F 17/142 708/404 |

* cited by examiner

*Primary Examiner* — Tan V. Mai
(74) *Attorney, Agent, or Firm* — John R. Pessetto; Frank D. Cimino

(57) ABSTRACT

A system includes a memory bank and a control unit. The control unit is configured to perform FFT computations based on Merged radix-2 butterfly calculations by performing FFT computations over N input items, and to access the memory bank for $(½×\log_2 N)×(10×\log_2 N)$ times.

12 Claims, 3 Drawing Sheets

APPROACH FOR SIGNIFICANT IMPROVEMENT OF FFT PERFORMANCE IN MICROCONTROLLERS

BACKGROUND

Discrete Fourier Transform (DFT) plays an important role in digital signal processing in various applications such as spectral analysis, frequency domain filtering and polyphase transformations. To implement the DFT, Cooley & Turkey proposed a Fast Fourier Transform (FFT) algorithm in 1960's. The proposed FFT algorithm comprises using a radix-2 butterfly calculation.

SUMMARY

Various systems and methods for improving efficiencies of Fast Fourier Transform (FFT) algorithm are disclosed herein. In some embodiments, a method includes receiving N input items, by a control unit, from a memory bank, performing FFT computations, by the control unit, over N input items, based on Merged radix-2 butterfly calculations, storing computed N items to the memory bank. The control unit is configured to use a Merged radix-2 butterfly to process FFT calculations over four input items across two consecutive stages.

In accordance with at least some embodiments, a system includes a memory bank and a control unit. The control unit is configured to perform FFT computations based on Merged radix-2 butterfly calculations by performing FFT computations over N input items, and to access the memory bank for $(½ \times \log_2 N) \times (10 \times \log_2 N)$ times.

In accordance with yet other embodiments, a processor includes a memory bank and a control logic. The control logic coupled to the memory bank is configured to perform FFT computations over N input items using Merged radix-2 butterfly calculations.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
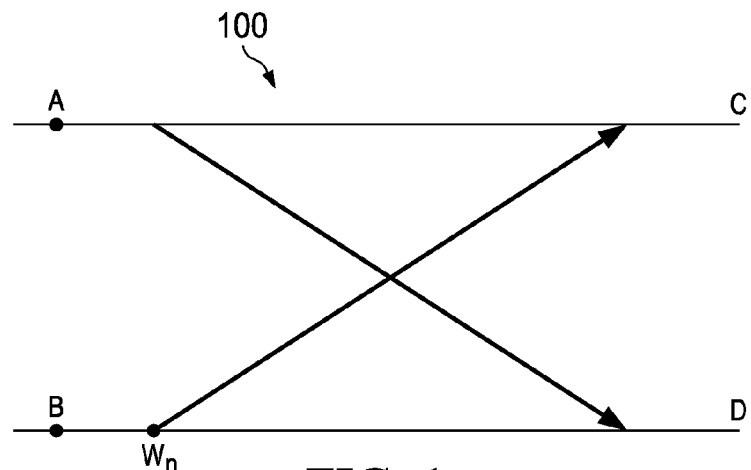
FIG. 1 shows a signal flow diagram of a radix-2 butterfly calculation for Fast Fourier Transform calculations in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Discrete Fourier Transform (DFT) plays an important role in digital signal processing in various applications such as spectral analysis, frequency domain filtering and polyphase transformations. The DFT converts an analog signal into a series of discrete signals by sampling the analog signal at or above the Nyquist frequency which means that often the DFTs involve a large number of calculations and memory operations and, as such, is not computationally efficient. To address the computational problem, Fast Fourier Transform (FFT) and Inverse Fast Fourier Transform (IFFT) have been developed and provide efficient algorithms to take advantage of the DFT.

Over the years, implementation of the FFT or IFFT in low-end microcontrollers (MCUs) has become highly desirable due to the low cost of such microcontrollers. Low cost microcontrollers typically do not have dedicated FFT acceleration hardware which, in part, leads to their low cost. Thus, a software-based implementation to calculate the FFT or IFFT is desirable. A software approach need not require specialized FFT acceleration hardware. In order to effectuate an efficient software-based algorithm, the Instruction Set Architecture (ISA) of microcontrollers is used. Implementing the FFT or IFFT calculations by using the ISA may cause an efficiency issue to recognize memory references in the microcontrollers due to long latencies and high power consumption. Thus, generally, to determine the efficiency of the ISA for manipulating the FFT or IFFT calculations, two factors may be considered. One is how many cycles the ISA needs to take to access a memory bank. The other is how efficient a memory reference for a specific input item can be recognized by using the ISA.

Embodiments of the present disclosure increase the efficiency to implement the FFT in devices such as microcontrollers through the ISA for the microcontroller. The preferred ISA described herein includes a plurality of instructions to reduce cycles for accessing a memory bank, and to cause the microcontroller to recognize memory references more efficiently, thus avoiding redundant cycle waste in pointing addresses of items stored in the memory bank. Both of these will be explained in detail as follows.

A DFT converts an analog signal to a series of discrete digital signals. The DFT may be computed as:

$$X(k) = \frac{1}{N}\sum_{n=0}^{N-1} x(n)e^{j\frac{-2\pi nk}{N}}$$

where:
N is the number of input items;
n is the particular index in the time domain sample from n=0 to n=N−1;
x(n) is the magnitude of the time domain analog signal at the time sample point corresponding to n;

$$e^{j\frac{-2\pi nk}{N}}$$

is a twiddle factor, is provided for each x(n), and is generally expressed as $W_N^{nk}$;
k is the particular frequency domain component from k=0 to k=N−1; and
X(k) is the magnitude of the frequency component corresponding to the frequency index k.

Since the DFT involves a large number of addition and multiplications, the FFT is proposed. Advantageously, using the FFT over N input items reduces a computational load from the order of $N^2$ to N $\log_2$ N by decomposing the DFT into a series of smaller and smaller DFTs. For example, a DFT with 8 input items can be decomposed into an FFT involving 3 stages of calculations. In this manner the 8 point FFT that can be decomposed into 4-point DFTs that are decomposed into four 2-point DFTs. At each stage of the FFT calculations, a canonical mathematical operation performed on each pair of input items is known as a radix-2 butterfly calculation, which will be discussed in detail below. Generally, the FFT and IFFT may utilize a radix-2 butterfly approach with either a decimation in time or decimation in frequency.

FIG. 1 shows a signal flow diagram of the radix-2 butterfly calculation 100 for FFT calculations in accordance with various embodiments. "A" and "B" represent the 2 inputs for the radix-2 butterfly calculation 100. Input B is multiplied by the twiddle factor, $W_n$, and that product is then added to the input A to compute output butterfly value C. Output butterfly value D is computed by subtracting B×$W_n$ from input A. That is:

$$C = A + (B \times W_n)$$

$$D = A - (B \times W_n)$$

In conventional FFT calculations, A, B, $W_n$, C and D need to be read from a memory bank in the radix-2 butterfly calculation 100, which means that a microcontroller for use with FFT calculations needs to spend at least five cycles of memory accesses to perform the radix-2 butterfly calculation 100, including but not limited to loading A from memory, loading B from memory, loading $W_n$ from memory, storing result C to memory, and storing D to memory. Further, by using the radix-2 butterfly calculation, the computation of FFT with N input items employs N/2 radix-2 butterfly calculations 100 per stage for $\log_2$ N stages. The results or output butterfly values of one stage are supplied as input items for one or more subsequent stages. For example, for an FFT calculation with 16 input items, the FFT calculation, based on the radix-2 butterfly calculations, needs 4 stages with each stage comprising 8 units of radix-2 butterfly calculations.

In general, the number of cycles of memory accesses is one of the most important factors to determine if a FFT calculation has been performed efficiently. More specifically, fewer memory access cycles leads to increased efficiency. Thus, minimizing the number of memory access cycles in the FFT calculation increases the efficiency and thus the performance of a microcontroller performing such an FFT. To effectuate the reduced cycles of memory accesses, embodiments of the present disclosure use a "Merged" radix-2 butterfly calculation as a basis to perform the FFT calculation as is explained below.

Figure 2:
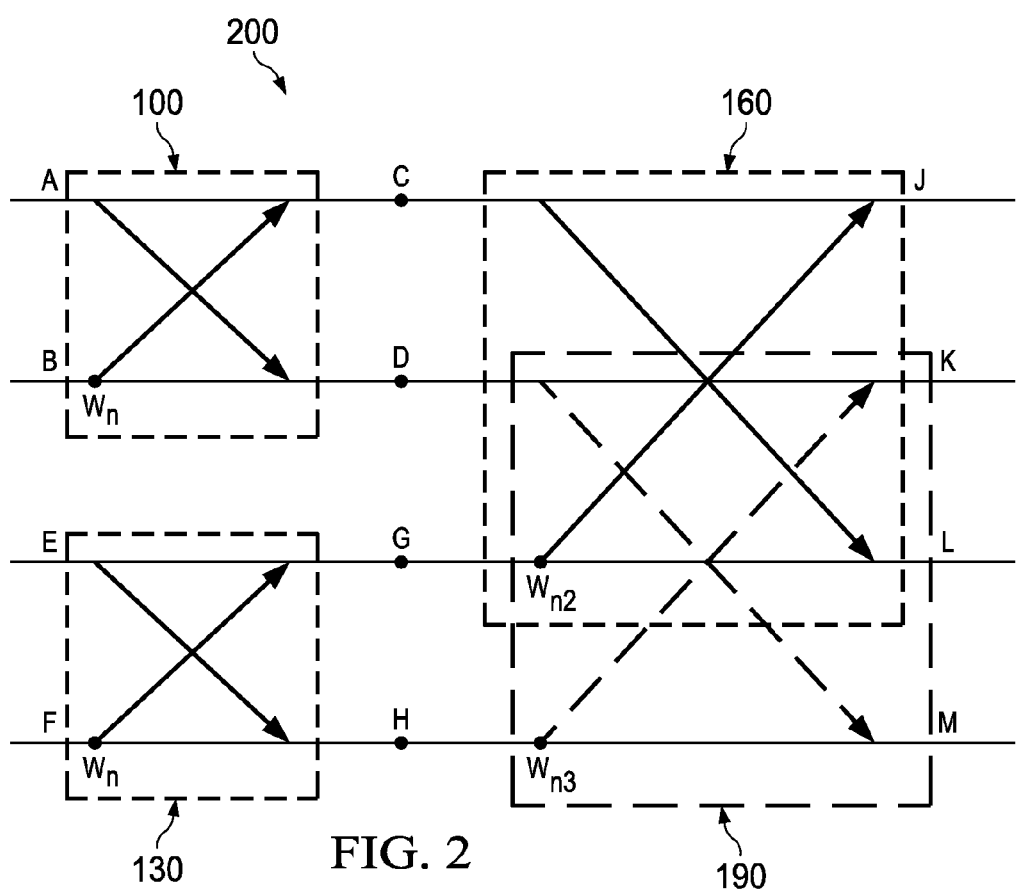
FIG. 2 shows a signal flow diagram of a Merged radix-2 butterfly calculation for Fast Fourier Transform calculations in accordance with various embodiments.

FIG. 2 shows a signal flow diagram of the Merged radix-2 butterfly calculation 200 for the FFT calculations in accordance with various embodiments. The Merged radix-2 butterfly calculation 200 includes four radix-2 butterfly calculations 100. "A", "B", "E" and "F" represent the 4 inputs for the Merged radix-2 butterfly calculation 200. Input B is multiplied by the twiddle factor, $W_n$, and that product is then added to the input A to compute output butterfly value C. Output butterfly value D is computed by subtracting B×$W_n$ from input A. Input F is multiplied by the twiddle factor, $W_n$, and that product is then added to the input E to compute output butterfly value G. Output butterfly value H is computed by subtracting F×$W_n$ from input E. Output butterfly values, C, D, G and H calculated by the two radix-2 butterfly calculations at stage "n" are used as the inputs for the two radix-2 butterfly calculations at stage "n+1". As such, Input G is multiplied by a twiddle factor, $W_{n2}$, and that product is then added to the input C to compute output butterfly value J. Output butterfly value L is computed by subtracting G×$W_{n2}$ from input C. Similarly, input H is multiplied by the twiddle factor, $W_{n3}$, and that product is then added to the input D to compute output butterfly value K. Output butterfly value M is computed by subtracting H×$W_{n3}$ from input D.

Referring still to FIG. 2, the Merged radix-2 butterfly calculation, across two consecutive stages stage n and stage (n+1), comprises four radix-2 butterfly calculations 100. In radix-2 butterfly calculations at stage n, instead of storing the output butterfly values C, D, G and H into a memory bank and then accessing the memory bank again to retrieve C, D, G and H from memory as input values for subsequent radix-2 butterfly calculations in calculating J, K, L and M, the Merged radix-2 butterfly calculation 200 saves computed C, D, G and H into registers of a control unit in the microcontroller (as further discussed below), rather than temporarily storing C, D, G and H in the memory external to the microcontroller. As such, by using the Merged radix-2 butterfly calculation 200, the number of cycles to access the memory bank may be reduced since the cycles needed to store and retrieve C, D, G and H from the memory have been eliminated.

More specifically, to perform the Merged radix-2 butterfly calculation 200, the memory bank only needs to be accessed in less cycles, including loading input items A, B, E and F, loading twiddle factors $W_n$, $W_{n2}$ and $W_{n3}$, and storing computed butterfly output values J, K, L and M to the memory bank. Thus, in this example, 7 values are loaded from memory (A, B, E, F, $W_n$, $W_{n2}$ and $W_{n3}$) and 4 values are stored to memory (J, K, L, and M). Conventional radix-2 butterfly calculations would have resulted in 11 values being loaded from memory (A, B, E, F, C, D, G, H, $W_n$, $W_{n2}$ and $W_{n3}$) and 8 values being stored to memory (C, D, G, H, J, K, L and M).

In some preferred embodiments, A-M, $W_n$, $W_{n2}$ and $W_{n3}$ are complex numbers, $W_{n2}$ and as such, they include a real part and an imaginary part. Further, due to the symmetry property of twiddle factors $W_{n2}$ and $W_{n3}$, $W_{n2}$ and $W_{n3}$ are expressed as, $$W_{n2} = \cos(2) - j\sin(2)$$

$$W_{n3} = \sin(2) - j\cos(2)$$

where 2 is an index number. Thus, via processing the twiddle factor in the control unit of the microcontroller, the total cycles of memory accesses for one Merged radix-2 butterfly calculation 200 may be reduced to 10 (loading A, B, E, F, $W_n$ and $W_{n2}$, and storing J, K, L and M), compared to 19 cycles (loading A, B, E, F, C, D, G, H, $W_n$ and $W_{n2}$, and storing C, D, G, H, J, K, L and M) required for performing four radix-2 butterfly calculations 100.

Moreover, one Merged radix-2 butterfly 200 employs four radix-2 butterfly calculation 100 over two consecutive stages. For a FFT calculation with N input items, a conventional algorithm based on the radix-2 butterfly calculation requires $\log_2 N$ stages. In contrast, use of the disclosed algorithm based on the Merged radix-2 butterfly calculation requires only half of the stages, $\frac{1}{2} \log_2 N$. As such, a total number of memory access is reduced to, $\frac{1}{2} \log_2 N \times 10 \log_2 N$.

Although the example given above is illustrated for performing the FFT calculations, the same principle can be applied for performing IFFT calculations.

Figure 3:
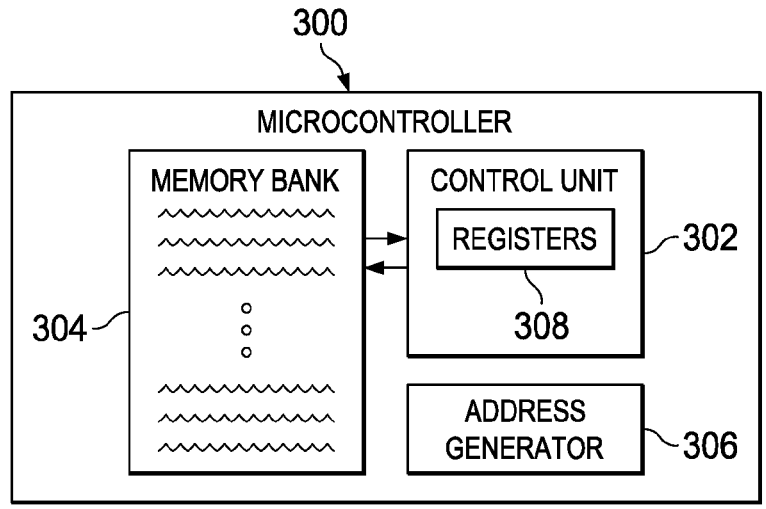
FIG. 3 shows a block diagram of a system for Fast Fourier Transform calculations in accordance with various embodiments.

The Merged radix-2 butterfly calculations are performed by executing various instructions. Such instructions may be executed by a control logic in a microcontroller. FIG. 3 shows an example of a block diagram of a microcontroller 300 for the FFT calculations in accordance with various embodiments. The system 300 includes control logic 302, a memory bank 304, and an address generator 306.

The control logic 302 reads input items from the memory bank 304 according to address pointers. The address pointers are provided by the address generator 306 to specify the location of each input item in the memory bank 304. Based on the address pointers, the control unit 302 executes instructions that reads input items at designated address pointers in the memory bank 304, and after performing the FFT calculations, writes computed output butterfly values into the memory bank 304 at designated address pointers.

In some embodiments, the control unit 302 executes the instructions retrieved from the memory bank. The instructions may comprise a first instruction configured to cause the control unit 302 to:

load two input items (e.g., A and B in FIG. 2) from the memory bank 304 into registers 308 of the control unit
  perform a radix-2 butterfly calculation on the two input items using a twiddle factor stored in the memory bank 304
  generate two output butterfly values (e.g., C and D)
  save the intermediate output values C and D into the control unit's registers 308.

That is, one instruction performs all three of the tasks listed above.

The instructions may further comprise a second instruction configured to cause the control unit 302 to:

read two input items (e.g., C and G in FIG. 2) from the registers 308 of the control unit 302
  perform a radix-2 butterfly calculation on the two input items using a twiddle factor stored in the memory bank 304
  generate two output butterfly values (e.g., J and L in FIG. 2).

Still referring to FIG. 2, the control unit 302 preferably executes two first instructions to perform the two radix-2 butterfly calculations 100 and 130, and generate four output butterfly values C, D, G and H which are stored in the registers 308 instead of the memory bank 304. Then two second instructions, instead of loading the input items C, D, G and H from the memory bank 304, cause the control unit 302 to read the input items C, D, G and H from the registers 308 and execute two radix-2 butterfly calculations 160 and 190 to generate four output butterfly values J, K, L and M. The output items J, K, L and M are stored in the memory bank 304, via executing a separate instruction by the control unit 300, for use as input items for one or more Merged radix-2 butterfly calculations at two next consecutive stages.

Figure 4:
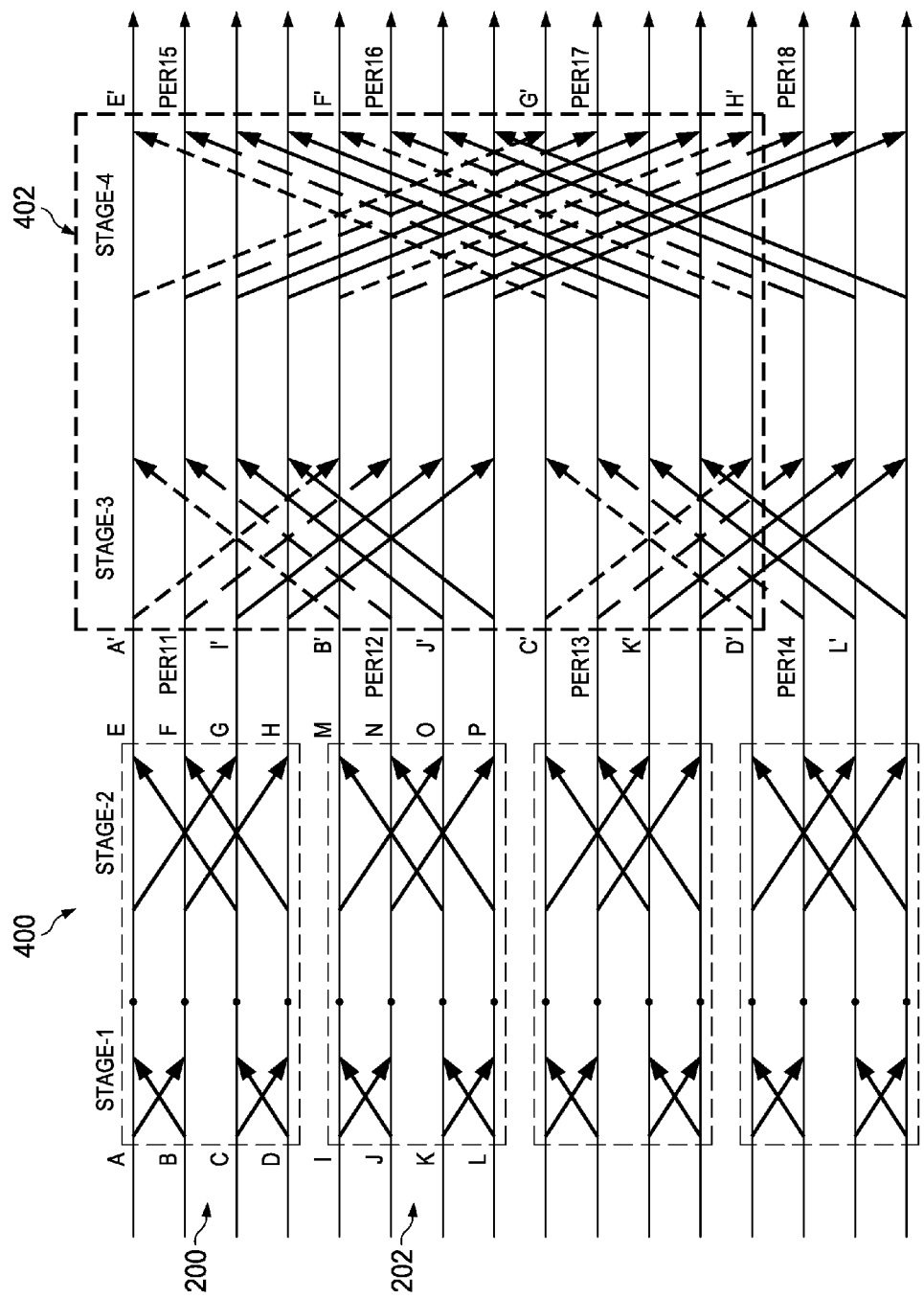
FIG. 4 diagramatically illustrates an example of Merged radix-2 butterfly calculations for Fast Fourier Transform calculations over 16 input items in accordance with various embodiments.

FIG. 4 shows a signal flow diagram 400, utilizing the Merged radix-2 butterfly calculation 200 for the FFT calculations over N (e.g., N=16 in FIG. 4) input items, via executing a plurality of instructions by the control unit 300, in accordance with various embodiments. As shown, a first Merged radix-2 butterfly calculation 200 is performed on four input items A, B, C and D at stage 1 and 2, and generates four outputs E, F, G and H. Subsequently a second Merged radix-2 butterfly calculation 202 is performed at the same stage 1 and 2 for four next input items I, J, K and L, and generates four outputs. A calculation loop at stage 1 and 2, including the first and the second Merged radix-2 butterfly calculations 200 and 202, continues until there are $\log_2 N$ (e.g., $\log_2 N = 4$ in FIG. 4) Merged radix-2 butterfly calculations which have been calculated. More specifically, in FIG. 4, four Merged radix-2 butterfly calculations are performed over sixteen input items at stage 1 and 2 to generate sixteen output butterfly values. These sixteen computed output butterfly values are stored in the memory bank 304 serving as input items for more Merged radix-2 butterfly calculations at stage 3 and 4.

Additionally or alternatively, input items A, B, C and D may be complex numbers, so that each A, B, C and D comprises a real part and an imaginary part and is expressed as, (R0:I0), where R0 refers to the real part of A and I0 refers to the imaginary part of A. Following the same analogy, B, C and D are expressed as follows, B=(R1:I1), C=(R2:I2), and D=(R3:I3). While a plurality of the first and second instructions executed by the control unit 300, a Merged radix-2 butterfly for input items A, B, C and D at stage 1 and 2 is performed to calculate four output butterfly values, E, F, G and H. More particularly, the four outputs, based on the Merged radix-2 butterfly calculations, may be derived as shown in Table 1. By using proposed Merged radix-2 butterfly calculations, as highlighted in Table 1, outputs F and H share several same terms in both the real part and the imaginary part. For example, (I0–I1) and (R2–R3) for the imaginary part, and (R0–R1) and (I2–I3) for the real part are both calculated as intermediate terms in a Merged radix-2 butterfly calculation. Following the same analogy, (I0+I1) and (I2+I3) for imaginary parts of outputs E and G, and (R0+R1) and (R2+R3) for real parts of outputs E and G are also used as intermediate terms in a Merged radix-2 butterfly calculation.

Via performing the Merged radix-2 butterfly calculation, those intermediate terms are pre-computed and saved in the registers 308. Thus, calculations of final output items (e.g., E, F, G and H) can be calculated in a more efficient fashion. For example, for outputs E and G, the intermediate terms, (I0+I1), (I2+I3), (R0+R1) and (R2+R3) have been calculated and saved in the registers 308. The calculation of final values of E and G as shown in Table 1 can be parallelized and done simultaneously.

TABLE 1

|   | Imaginary Part | Real Part |
| --- | --- | --- |
| E | $(I_0 + I_1) + (I_2 + I_3)$ | $(R_0 + R_1) + (R_2 + R_3)$ |
| F | $(I_0 - I_1) - (R_2 - R_3)$ | $(R_0 - R_1) + (I_2 - I_3)$ |
| G | $(I_0 + I_1) - (I_2 + I_3)$ | $(R_0 + R_1) - (R_2 + R_3)$ |
| H | $(I_0 - I_1) + (R_2 - R_3)$ | $(R_0 - R_1) - (I_2 - I_3)$ |

Still referring to FIG. 4, as highlighted in dotted line at stages 3 and 4, the control unit 302 executes the first and the second instructions to perform a Merged radix-2 butterfly calculation 402 over four input items A', B', C' and D' read from the memory bank 304, and to generate four outputs E', F', G' and H' at stage 4. The four input items A', B', C' and D' are the outputs computed by previous Merged radix-2 butterfly calculations at stage 1 and 2. Following a similar fashion described to address the algorithm used at stage 1 and 2, a calculation loop continues, starting with a second Merged radix-2 butterfly calculation over four input items I', J', K' and L', at stage 3 and 4 till there are $\log_2 N$ (e.g., $\log_2 N=4$ in FIG. 4) Merged radix-2 butterfly calculations which have been calculated at stage 3 and 4. Following the same logic used in stage 1 and 2, a plurality of intermediate terms are used in Merged radix-2 butterfly calculations in order to perform the FFT more efficiently.

To access the memory bank 304, the control unit 302 executes instructions to load each input item from the memory bank 304 at designated address pointers as specified by the address generator 306. In some embodiments, by using the disclosed Merged radix-2 butterfly calculation 200, each address pointer needs only to increase by one in order to transition from one Merged radix-2 butterfly calculation to a next Merged radix-2 butterfly calculation. For example, the first butterfly calculation 200 at stage 3 and 4 in FIG. 4, the control unit 302 loads four input items at address pointers Ptr3, Ptr4, Ptr5 and Ptr6 from the memory bank 304, and stores computed butterfly values at address pointers Ptr7, Ptr8, Ptr9 and Ptr10 into the memory bank 304. Subsequently, for a next butterfly calculation 200, Ptr11, Ptr12, Ptr13 and Ptr14 are used to load four input items from the memory bank 304; and Ptr15, Ptr16, Ptr17 and Ptr18 are used to store computed output values into the memory bank 304. Thus, Ptr3 is incremented by one to generate Ptr11, Ptr4 is incremented by one to generate Ptr12, and so on.

Figure 5:
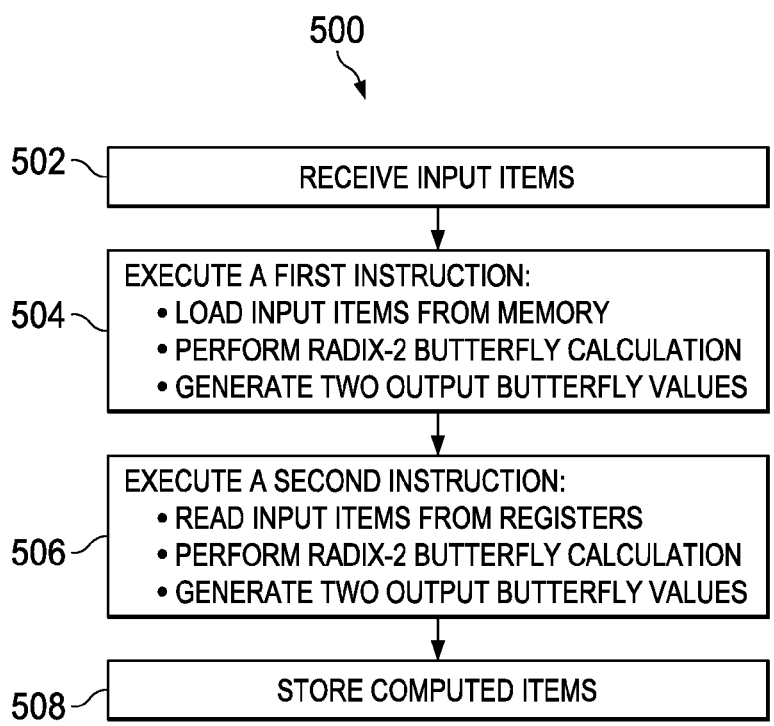
FIG. 5 shows a flow diagram for a method for implementing Merged radix-2 butterfly calculations in accordance with various embodiments.

FIG. 5 shows a flow diagram for a method 500 for implementing the Merged radix-2 butterfly calculations in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 500, as well as other operations described herein, can be implemented by processor (e.g., control logic 302) executing instructions which may be stored in a memory (e.g., memory bank 304) or a computer readable medium.

In block 502, the control unit 302 receives N input items from the memory bank 304. These N input items are, stored in the memory bank 304, at designated address points specified by the address generator 306.

In block 504, the control unit 302 executes the first instruction to load two input items from the memory bank 304 into registers of the control unit 302 and perform the radix-2 butterfly calculation (e.g., 100 in FIG. 2) on the two input items using a twiddle factor stored in the memory bank 304, to generate two intermediate output butterfly values (e.g., C and D). These two intermediate output butterfly values are stored in the registers of the control unit 302, and serve as input items for subsequent butterfly calculations. In some preferred embodiments, the control unit 302 may execute one or more the first instruction in a unit of Merged radix-2 butterfly calculation 200.

In block 506, the control unit 302 executes the second instruction to perform the radix-2 butterfly calculation (e.g., 160 in FIG. 2) on two input items (e.g., C and G) read from the registers of the control unit 302 using a twiddle factor stored in the memory bank 304, to generate two final output butterfly values (e.g., J and L). Still in some preferred embodiments, the control unit 302 may execute one or more the second instruction in a unit of Merged radix-2 butterfly calculation 200.

In block 508, the control unit 302 stores the computed final output butterfly values into the memory bank 304. In some embodiments, these final output butterfly values may be used as input items for butterfly calculations at subsequent stages.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   receiving N input items, by a control unit, from a memory bank;
   performing Fast Fourier Transform (FFT) computations, by the control unit, over the N input items, based on Merged radix-2 butterfly calculations;
   storing computed N items to the memory bank; and
   wherein the control unit is configured to use a Merged radix-2 butterfly calculation to process FFT calculations over four input items across two consecutive stages;
   further comprising, by the control unit, accessing the memory bank for $(\frac{1}{2}\times\log_2 N)\times(10\times\log_2 N)$ times to receive the N input items and twiddle factors, and store the N computed items.

2. A method, comprising:
   receiving N input items, by a control unit, from a memory bank;
   performing Fast Fourier Transform (FFT) computations, by the control unit, over the N input items, based on Merged radix-2 butterfly calculations;
   storing computed N items to the memory bank; and
   wherein the control unit is configured to use a Merged radix-2 butterfly calculation to process FFT calculations over four input items across two consecutive stages;
   further comprising, by the control unit, executing a second instruction wherein the second instruction comprises:
   performing a radix-2 butterfly calculation by reading two input items from the control unit and using a twiddle factor stored in the memory bank to generate two output butterfly values.

3. A system, comprising:
   a memory bank; and
   a control unit configured to perform Fast Fourier Transform (FFT) computations based on Merged radix-2 butterfly calculations by performing FFT computations over N input items, and to access the memory bank for $(\frac{1}{2}\times\log_2 N)\times(10\times\log_2 N)$ times.

4. The system of claim 3, wherein the control unit is configured to execute a first instruction that causes the control unit to:
   load two input items from the memory bank into registers of the control unit; and
   perform a radix-2 butterfly calculation on two input items using a twiddle factor stored in the memory bank, to generate two output butterfly values.

5. The system of claim 3, wherein the control unit is configured to execute a second instruction that causes the control unit to:
   perform a radix-2 butterfly calculation by reading two input items from the control unit and using a twiddle factor stored in the memory bank to generate two output butterfly values.

6. The system of claim 3, wherein the control unit performs a unit of a Merged radix-2 butterfly calculation at two consecutive stages, and generates four output butterfly values as input items for butterfly calculations at two next consecutive stages.

7. The system of claim 6, wherein the one unit of Merged radix-2 butterfly calculation comprises four radix-2 butterfly calculations.

8. The system of claim 6, wherein the control unit performs a calculation loop that iterates a unit of a Merged radix-2 butterfly calculation $\log_2 N$ times at two consecutive stages.

9. A processor, comprising:
a memory bank; and
a control logic coupled to the memory bank is configured to perform Fast Fourier Transform (FFT) computations over N input items using Merged radix-2 butterfly calculations;
wherein the control unit accesses the memory bank to retrieve input items and stores the input items in registers in the control unit for the Merged radix-2 butterfly calculations; and
wherein the control unit retrieves the input items, from the registers in the control unit, for the Merged radix-2 butterfly calculations.

10. The processor of claim 9, wherein the control unit performs FFT computations over N input items, based on Merged radix-2 butterfly calculations, via accessing the memory bank for $(½×\log_2 N)×(10×\log_2 N)$ times.

11. The processor of claim 9, wherein the control unit is configure to execute an instruction, wherein the instruction comprises:
load, by the control unit, two input items from the memory bank into registers of the control unit;
perform, by the control unit, a radix-2 butterfly calculation on two input items using a twiddle factor stored in the memory bank, to generate two output butterfly values; and
perform, by the control unit, a radix-2 butterfly calculation on two input items read from registers of the control unit using a twiddle factor stored in the memory bank, to generate two output butterfly values.

12. The processor of claim 9, wherein the control unit performs a unit of a Merged radix-2 butterfly calculation over four input items across two consecutive stages, and generates four output butterfly values as input items for butterfly calculations at two next consecutive stages.

\* \* \* \* \*